United States Patent
Pivnichny et al.

[19]

[11] Patent Number: 5,974,445
[45] Date of Patent: Oct. 26, 1999

[54] WEB BROWSER WHICH CHECKS AVAILABILITY OF HOT LINKS

[75] Inventors: John Robert Pivnichny; Arthur Jay Samodovitz, both of Vestal, N.Y.

[73] Assignee: International Business Machines Corporation, Armonk, N.Y.

[21] Appl. No.: 08/959,507

[22] Filed: Oct. 28, 1997

[51] Int. Cl.$^6$ ........................................... G06F 13/00
[52] U.S. Cl. ............................................................. 709/203
[58] Field of Search ........................ 364/DIG. 1 MS File, 364/DIG. 2 MS File; 709/200, 202, 203, 217, 224, 218, 219, 221, 223, 228, 229; 706/10

[56] References Cited

U.S. PATENT DOCUMENTS 5,727,129  3/1998  Barrett et al. ............................... 706/10
5,870,559  2/1999  Leshem et al. ........................... 709/224

OTHER PUBLICATIONS

IBM Patent Application S.N. 08/659,100, filed Jun. 4, 1996, "System And Method For Recording History Of Use of An Information System", R. C. Barrett.

IBM Patent Application S.N. 08/785,912, Filed Jan. 21, 1997, "Pre–Loading Of Web Pages Corresponding To Designated Links In HTML", M. Bomar et al.

IBM Patent Application S.N. 08/785,913, Filed Jan. 21, 1997, "Deferred Display Of Web Pages Corresponding To Links Selected By User", M. Allen et al.

IBM Patent Application S.N. 08/656,458, Filed May 31, 1996, "System And Method For Displaying A Graphical Representation Of An Entity Along With A Related Parameter Of The Entity", R. D. Barrett.

Web Techniques, vol. 2, No. 6, Jun., 1997.
Battle of the Web Site Builders, vol. 21, No. 2, Jul., 1996.
Hypertext Transfer Protocol—HTTP/1.1.

*Primary Examiner*—Robert B. Harrell
*Attorney, Agent, or Firm*—Arthur J. Samodovitz

[57] ABSTRACT

A web browser checks availability of hot links on a displayed web page. The web browser requests header information from one or more servers for a plurality of hot links on the displayed web page. In response to receipt of the header information for one of the hot links, the web browser indicates on the displayed web page that the one hot link is available. In response to failure to receive the header information for another of the hot links, the web browser indicates on the displayed web page that the other hot link is not available.

35 Claims, 9 Drawing Sheets

WEB BROWSER WHICH CHECKS AVAILABILITY OF HOT LINKS

BACKGROUND OF THE PRESENT INVENTION

The present invention relates generally to web browsers and deals more particularly with a web browser which automatically checks availability of hot links on a displayed web page before the user selects the hot links.

The world wide web (WWW) comprises a multitude of computer servers, respective databases which are managed by the servers and contain web pages and a network by which clients can communicate with the servers and thereby request and load web pages of interest. Each of the clients includes a "web browser" which is an interface to the user and the WWW. One common web browser is the Netscape Navigator (tm) web browser licensed by Netscape Communications Corporation. The Netscape Navigator web browser is further described in "Hands on Netscape" by David Sachs, Prentice Hall, Upper Saddle River, N.J., 1996 ISBN013240284X.

Each web page has a "URL" address which comprises an access method/protocol designation such as hypertext transport protocol (HTTP) as a prefix, a server name, and the requested data as a suffix. The server name typically includes a "domain name" which is the name of a company, educational institution or other organization that owns the server. The request indicates a web page associated with the server. There are different ways that a client can obtain a web page. If the client knows the URL, the client can directly request the web page from the server. However, if the client only knows the server name, the client can address the server name and in response, the server will present the "home page" for the server. The home page (and other web pages) typically includes tags or "hot links" which reference other associated web pages. When the user selects a hot link, the web browser requests the respective web page from the corresponding server.

In recent years there has been a large increase in the number of servers, web pages and "network traffic" on the WWW. The expansion of the WWW, while advantageous for information exchange, has lead to various problems. The network may become congested, slowing or even preventing traffic. A server may be too busy with other requests to service every request it receives. A server may even be deleted altogether although it continues to be addressed via hot links of various web pages. Many web pages are not managed properly and some have been deleted altogether although they continue to be referenced by hot links on other web pages. Consequently, when a user requests a web page by a hot link or URL, often the web page cannot be accessed immediately or ever for that matter. This wastes the user's time and causes dissatisfaction with the WWW.

An IBM Web Browser Intelligence tool gives the user valuable information to avoid some of the time wastage. The IBM Web Browser Intelligence tool automatically "pings" each server referenced by a hot link on a web page when the web page is initially loaded and displayed. If the server is in existence and is available to process the ping request, the server responds with a simple acknowledgment of its existence. The IBM Web Browser Intelligence tool also estimates the time required to fetch web pages managed by this server by measuring the time between the sending of the ping request and receipt of an acknowledgment from the server. (The actual fetch time will also depend on the length of the HTML and associated graphics and the performance and workload of the server and web page storage media when the actual fetch request is made). The IBM Web Browser Intelligence tool then indicates to the user which servers currently exist and the approximate fetch rate as follows. Red dots adjacent to a hot link indicate that the server is not currently available or very slow to respond. Yellow dots adjacent to a hot link indicate that the respective server is currently available but the fetch rate is slow. Green dots adjacent to a hot link indicate that the respective server is currently available and the fetch rate is fast. The IBM Web Browser Intelligence tool re-pings each server associated with each hot link at a user specified interval to update the availability status of every hot link. Despite the significant value of the IBM Web Browser Intelligence tool, it does not determine whether particular web pages managed by the server are available.

Another web browser tool actually loads into a client buffer all web pages referenced by the hot links on another web page when this other web page is initially loaded and displayed. This makes the hot linked web pages immediately available to the user when the user selects the hot links. However, this web browser tool causes substantial network traffic to load all the web pages, and the user will not ordinarily want to view the web pages referenced by all hot links of the displayed web page.

A general object of the present invention is to automatically determine availability of web pages referenced by hot links on a displayed web page before the user selects the hot links.

A more specific object of the present invention is to make this determination without congesting the network.

Another specific object of the present invention is to periodically and selectively update the availability status of web pages corresponding to the hot links without congesting the network.

SUMMARY OF THE INVENTION

The invention resides in a web browser for checking availability of hot links on a displayed web page. The web browser requests header information from one or more servers for a plurality of hot links on the displayed web page. In response to receipt of the header information for one of the hot links, the web browser indicates on the displayed web page that the one hot link is available. In response to failure to receive the header information for another of the hot links, the web browser indicates on the displayed web page that the other hot link is not available.

According to one feature of the present invention, the web browser retries those hot links that were not available during the first try, but does not retry those hot links that were available during the first try.

According to other features of the present invention, the web browser only retries certain of the hot links that were not available during the first try, such as those for which no response at all was received to the header request and those for which the header information was not received because the web page was not found.

DETAILED DESCRIPTION OF THE PREFERRED EMBODIMENTS

Figure 1:
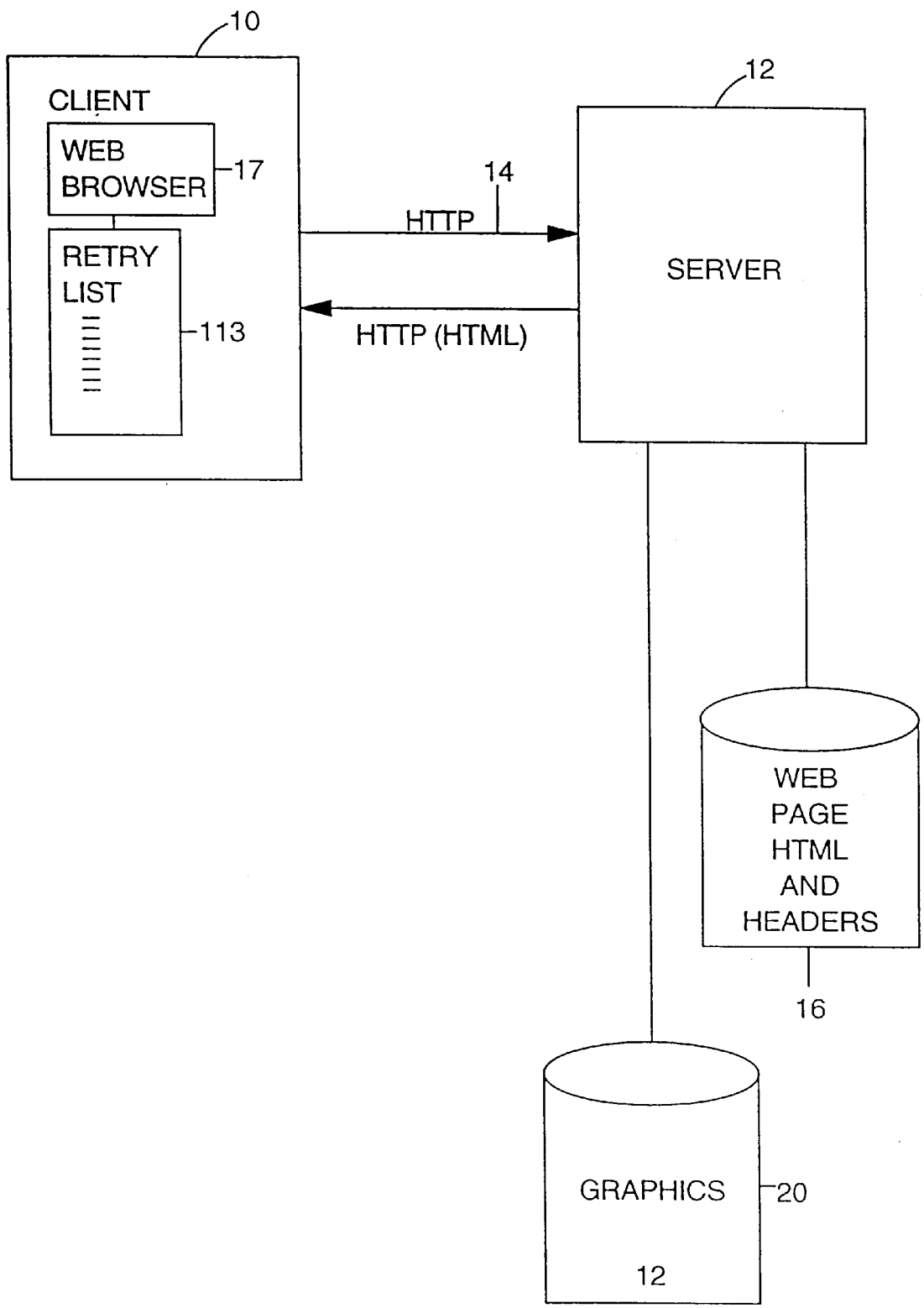
FIG. 1 is a block diagram of a client, a server and networking communication lines on the WWW in accordance with the present invention.

Referring now to the drawings in detail wherein like reference numbers indicate like elements throughout, FIG. 1 illustrates a client 10, server 12 and networking communication lines 14. Server 12 manages a data base 16 of HTMLs stored on DASD. There can be other, "intermediary" servers (not shown) between client 10 and server 12. The client 10 includes a web browser 17. In the illustrated example, web browser 17 communicates with the server 12 using the HTTP access method. The server can return an HTML for a web page imbedded in the HTTP communication. The intermediary servers, if any, also communicate with the client and server 12 using the HTTP access method.

The HTML defines the composition of each entry on the web page and the nature of the entry—text, graphic and/or hot link. While the HTML contains the actual text, the HTML contains only a pointer to each graphic and not the graphic itself. The graphics may be stored in a different data base managed by the same or different server. In the illustrated example, server 12 also manages the graphics data base 20 and uses the HTTP access method for the graphics. (Alternately, a file transport protocol (FTP) access method could be used to access the graphics data base.) The industry standard format of the HTMLs is further described in "HTML for Fun and Profit" by Mary E. S. Morris published in 1995 by SunSoft press, A Prentice Hall title.

The following is an example of an HTML:

```
33.  <HTML>
35.  <HEAD>
37.  <TITLE>Joan's home page<TITLE>
39.  </HEAD>
40.  <CENTER><H1>Joan</H1></CENTER>
41.  <CENTER><b><i>Last Update - </i></b><tt>September 06th,
     1996</tt></CENTER>
42.  <p><br>
43.  <center><h3><IMG SRC = "pics/icons/smiley.gif">
48.  RESUME </h3></center>
49.  <hr>
50.  <IMG src="jason.gif" border=0 align=right ALT="Photo not
     displayed...">
52.  Joan_in_ny@vnet.ibm.com (Internal MCCAMBRI at
     GDLVM7)<br>
54.  <P>
60.  607-123-4567 <br>
     <br>
     <p>
70.  <a href="quicklist.html"> Most Used and Favorite Links </a>
     <br CLEAR=ALL>
80.  <RIGHT>No Photo Available for me...Here is my son
     Jason</RIGHT>
     <HR>
     <br>
86.  <A HREF="people.htm"> <IMG SRC="people2.jpg"
     WIDTH=100 HEIGHT=56></A>
```

-continued

```
88.  <A HREF="resumes.htm"> <IMG SRC="resumes2.jpg"
     WIDTH=100 HEIGHT=56
     ALT="resumes"><'A>
     <br>
     <HR>
     </BODY>
     </HTML>
```

The first entry 33 "<HTML>" indicates that this is an html. The next entry 35 "<HEAD>" indicates page header. The next entry 37 begins with a tag "<TITLE>" which indicates that the subsequent text is a title of the web page used for print job name and quicklist. The next entry 39 is the tag </HEAD> which indicates end of page header. The next entry 40 begins with the tag <CENTER><H1> and indicates the subsequent text should be centered. Likewise the next entry 41 begins with the tag <CENTER> and indicates that the subsequent text should be centered. The next entry 42 comprises the tag <p><br> which indicates paragraph and break. The next entry 43 begins with the <center> format tag and also includes a tag <IMG src which indicates that the following file names the graphic. Entry 48 indicates the text "RESUME" and the center format. The next entry 49 in the html is "<hr>" which means horizontal rule, i.e. straight line. The next entry 50 describes non-clickable graphic <IMG src="jason.gif" is the URL for the source of the graphic itself. "Border=0" and "align=right" specify the border and alignment characteristics of the graphic. The next entry 52 is the nonclickable text. The next entry 54 means a paragraph. The next entry 60 is for nonclickable text. Entry 70 begins with tag "<a>" which means that the subsequent text is a hot link/clickable text. Entry 80 is for nonclickable text. Entry 86 is for a hot link/clickable graphic which does not include any alternate text. Entry 88 is for a hot link/clickable graphic, and includes alternate text "Resumes". Thus, each hot link in the HTML is prefaced by <a> or <A>, and the hot links may be simple text or graphics with or without alphanumeric characters. Upon receipt of an HTML, web browser 17 converts the HTML to a display of the web page, fetching the graphics as required. The foregoing HTML and display process is well known in the prior art.

Figure 2:
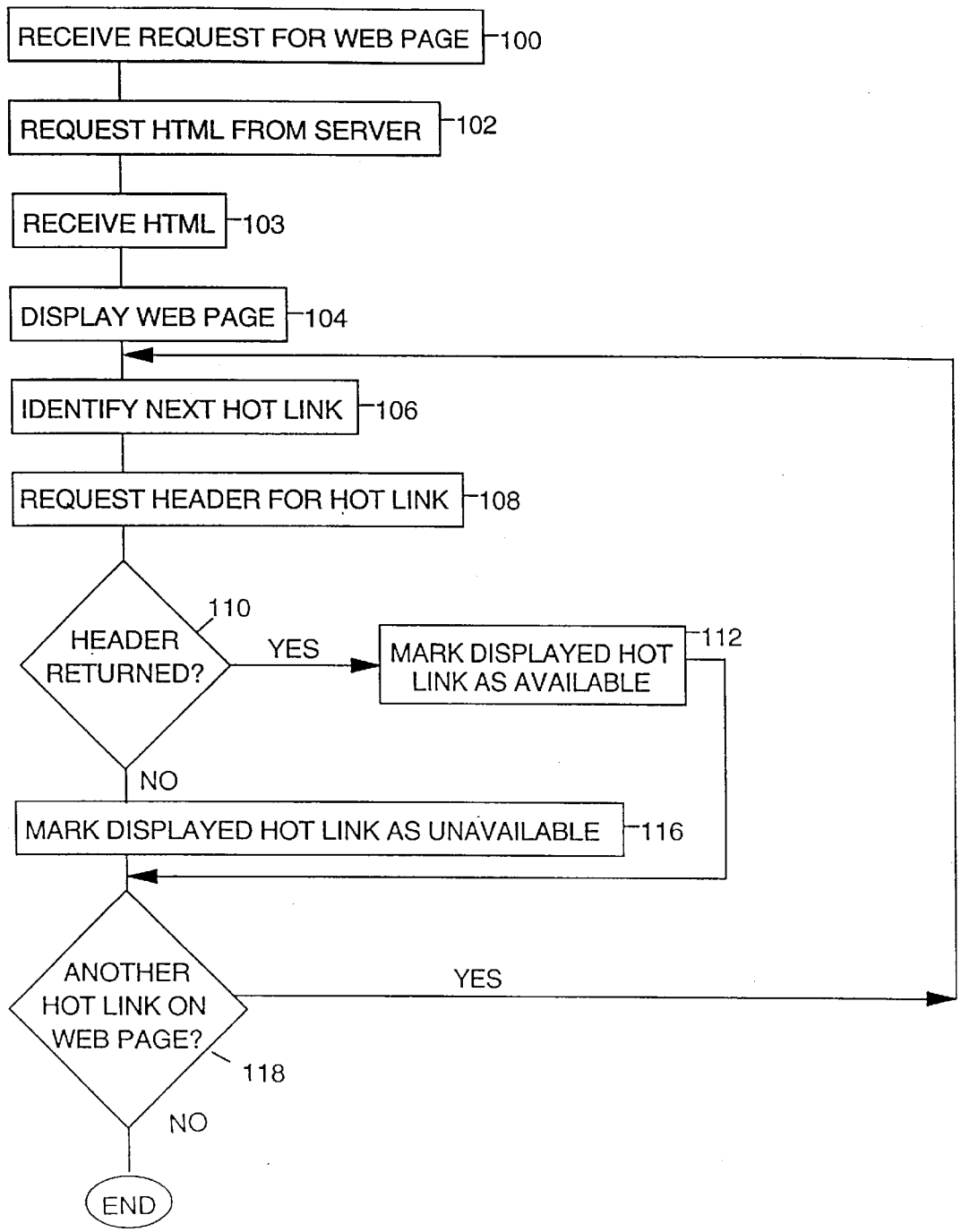
FIG. 2 is a flow chart illustrating a web browser in the client of FIG. 1 according to one embodiment of the present invention.

Steps 100, 102, 103 and 104 of FIG. 2 illustrate a known process performed by web browser 10 for fetching and displaying a web page. In step 100, the web browser 17 receives a request from a user for a web page. The request can be made by the user specifying a URL or selecting a hot link. In the latter case, the web browser converts the hot link selection to a URL. Once the URL is known, either from the user or from the conversion, the web browser requests the HTML from the respective server (step 102). For purposes of explanation, assume that server 12 manages the requisite HTML. Assuming that server 12 exists, server 12 is currently available and the requested HTML/web page currently exists, server 12 returns the HTML to client 10 (step 103). Then, client 10 displays the web page corresponding to the HTML (step 104). For purposes of explanation, assume this web page includes multiple hot links, and all the hot links reference web pages managed by server 12. However, the present invention is not limited to such an arrangement; web browser 17 can also check hot links which reference web pages managed by multiple, different servers.

The remaining steps of FIG. 2 illustrate a process performed by web browser 17 according to the present invention. The web browser automatically identifies from the HTML the first hot link on the web page (step 106). Then, the web browser sends a header request to the server 12 for the web page corresponding to this hot link (step 108). The header request has the following form—HEAD (SPACE) REQUEST-URI (SPACE) HTTP-VERSION (CARRIAGE RETURN LINE FEED) as described in Hypertext Transfer Protocol—HTTP1.1" by R. Fielding et al., World Wide Web Consortium, Cambridge, Mass. January 1997 pages 35 and 50, which pages are hereby incorporated by reference as part of the present disclosure. The header request does not request (or obtain) the body of the hot linked web page; i.e., does not request the HTML data defining the body of the web page. (A header request used to obtain header information was known in the Prior Art. It was used to obtain header information for the purpose of obtaining information about the web page such as the date or length without transferring the web page itself. However, it was not previously known to use the header request for hot links on a displayed web page to notify the user which hot linked web pages are currently available.)

Various scenarios can result from the request for the header for each hot linked web page.

First Scenario

Server 12 is currently in existence and available, server 12 receives the header request for the specified web page, server 12 searches for the header information based on the URI in the header request (the header information being stored in association with the HTML for that web page), the web page which is the subject of the header request is currently in existence and the header information is available. Server 12 returns the header information to web browser 17.

Four embodiments of the present invention are illustrated in FIGS. 2–5, respectively. In these embodiments, the web browser receives the header information (decision 110), and marks the display of the respective hot link as available (step 112). Assuming there are other hot links on the displayed web page yet to be checked (decision 118), web browser 10 loops back to step 106 for the next hot link on the displayed web page.

Second Scenario

The web browser 17 does not get any response to the header request and times out or receives a "404" ("not found") return code from server 12 or an intermediary server indicating that the web page is currently unavailable. This and other pertinent return codes are described in Hypertext Transfer Protocol—HTTP1.1" by R. Fielding et al., World Wide Web Consortium, Cambridge, Mass. January 1997 pages 1, 60 and 62, which pages are hereby incorporated by reference as part of the present disclosure. The "404" return code does not indicate whether the web page is temporarily unavailable or permanently unavailable. The "404" return code also does not indicate whether the server is available, temporarily unavailable or permanently unavailable.

In the embodiment of FIG. 2, the web browser receives the "404" return code but not the header information (decision 110), and marks the display of the respective hot link as unavailable (step 116). Then, assuming there are other hot links on the displayed web page yet to be tested (decision 118), web browser 17 loops back to step 106 for the next hot link on the displayed web page. This embodiment of the present invention does not retry any hot links.

Figure 3:
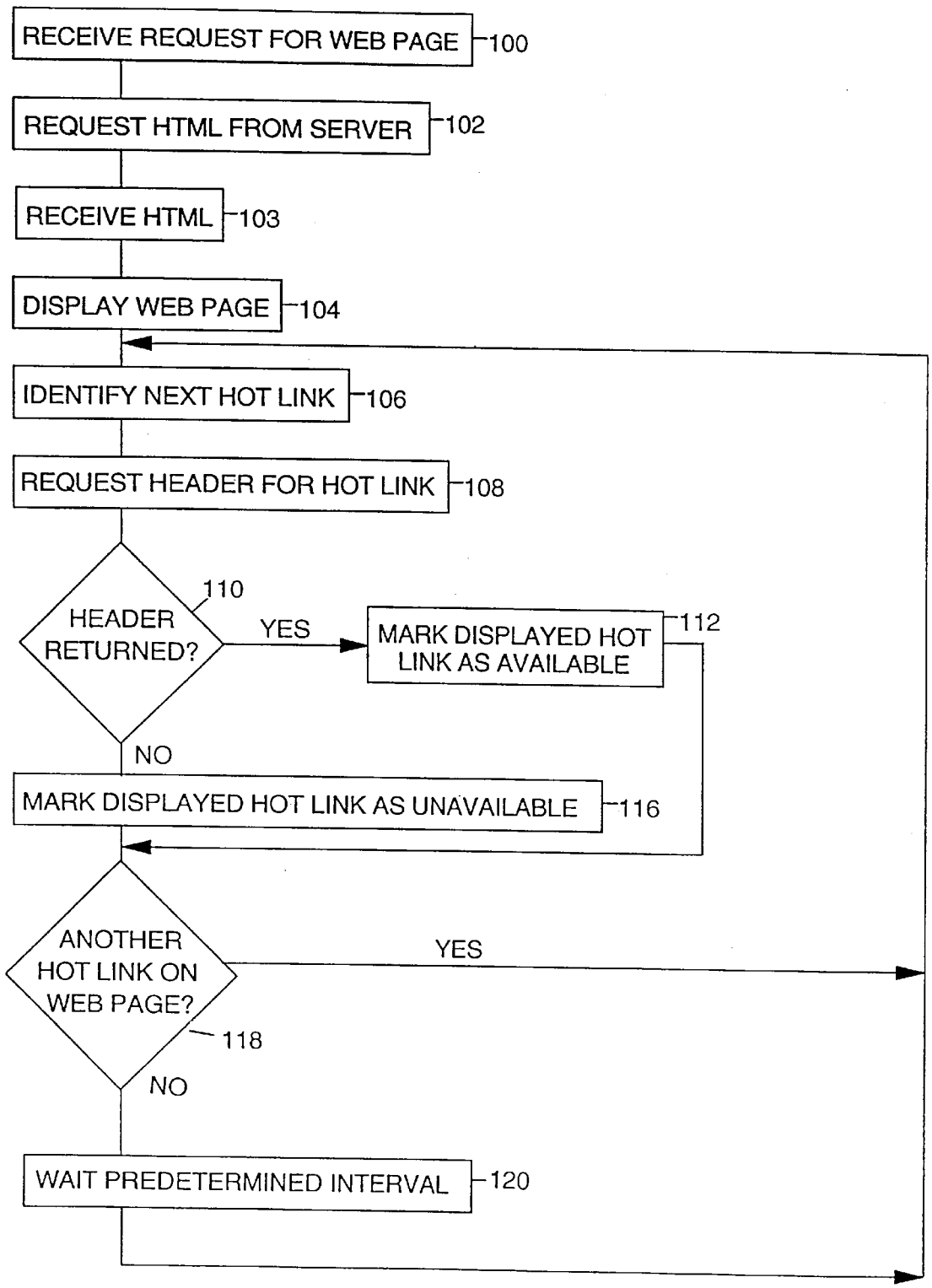
FIG. 3 is a flow chart illustrating a web browser in the client of FIG. 1 according to another embodiment of the present invention.

In the embodiment of FIG. 3, the web browser receives the "404" return code but not the header information (decision 110), and marks the display of the respective hot link as unavailable (step 116). Then, assuming there are other hot links on the displayed web page yet to be tested (decision 118), web browser 17 loops back to step 106 for the next hot link on the displayed web page. After all the hot links on the displayed web page have been tested (decision 118), the web browser waits a predetermined period such as sixty seconds and then repeats the test for all links on the web page (step 120). The waiting between iterations is intended to reduce network traffic.

Figure 4:
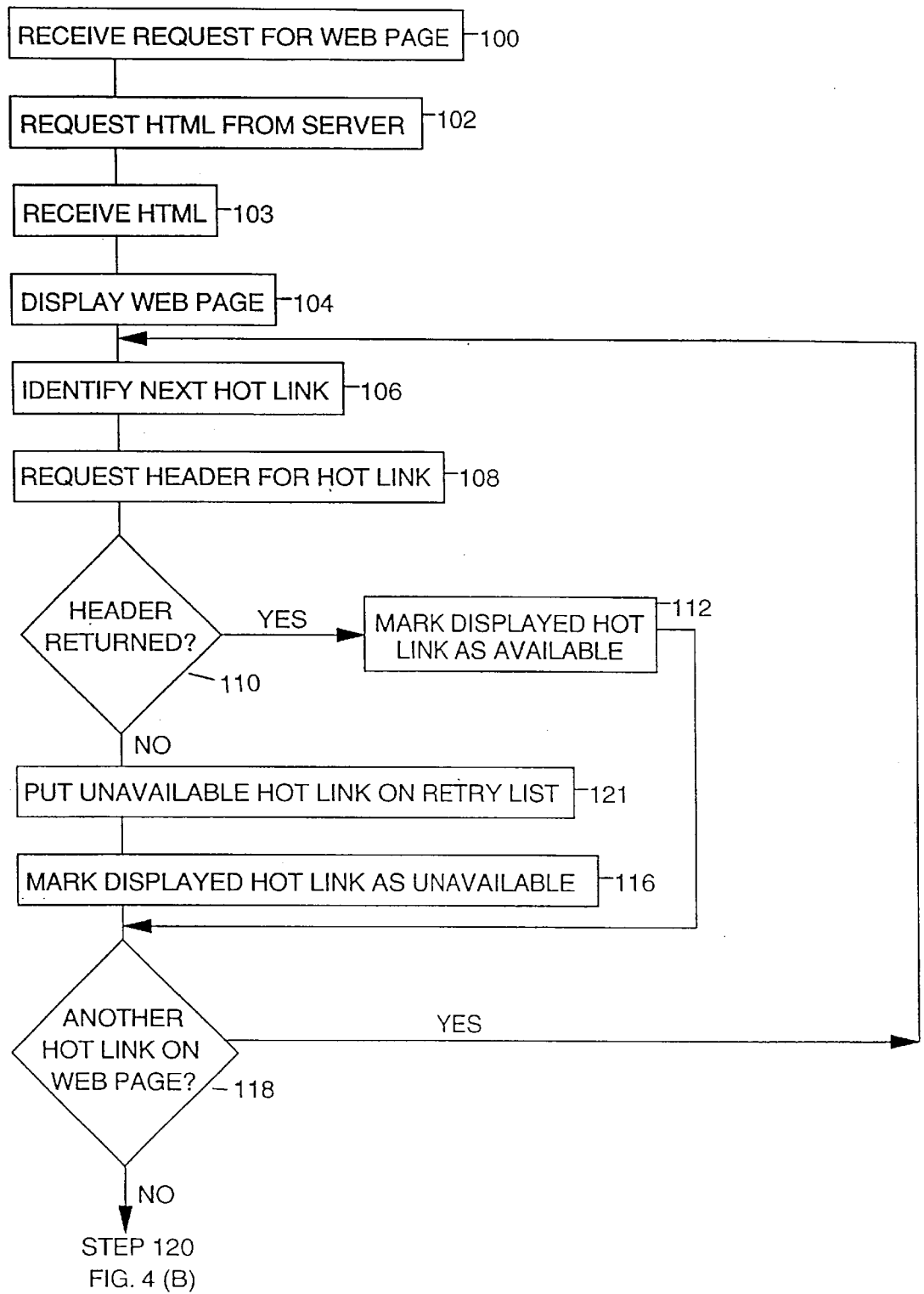
FIGS. 4(a) and 4(b) are flow charts illustrating a web browser in the client of FIG. 1 according to still another embodiment of the present invention.
Figure 4:
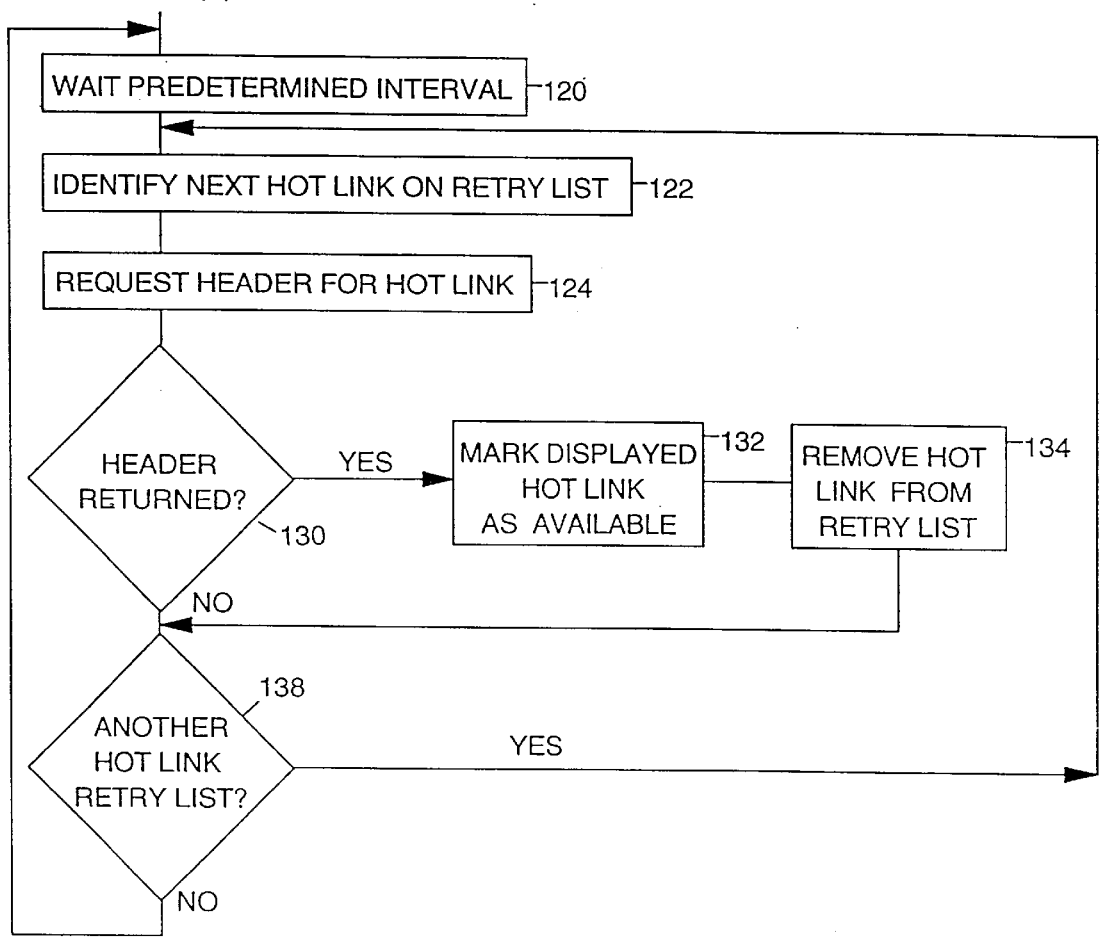

In the embodiment of FIG. 4, the web browser receives the "404" return code but not the header information (decision 110), adds the hot link/web page to a retry list 113 (step 121) and marks the display of the respective hot link as unavailable (step 116). (The embodiment of FIG. 4 will add all unavailable hot links to the retry list regardless of the reason for unavailability.) Then, assuming there are other hot links on the displayed web page yet to be tested (decision 118), web browser 17 loops back to step 106 for the next hot link on the displayed web page. After all the hot links on the web page have been tested (decision 118), the web browser waits a predetermined period such as twenty seconds (step 120) and then identifies the first hot link on the retry list (step 122). Then, the web browser sends a header request to server 12 for the hot linked web page on the retry list (step 124). If the header information is returned (decision 130), then web browser 17 changes the marking of the displayed hot link to indicate availability (step 132) and removes this hot link from the retry list (step 134). However, if the header information was not returned (decision 130) there is no cause to change the display. After either step 134 or a "no" decision 130, web browser 17 loops back to step 122 for the next hot link, if any, on the retry list (decision 138). When all the hot linked web pages on the retry list have been retried (decision 138), the web browser loops back to step 120 to wait another predetermined time interval and retry the remaining hot links, if any, on the retry list.

In this embodiment of the present invention, web browser 17 does not retry those hot links which were found to be available during the previous iteration because this creates network traffic and is not essential. If the status of such a web page changes to unavailable, the worst that can happen is that the user will select this hot link and be disappointed. While such a disappointment in not optimum, in many circumstances it is preferable to an increase in network traffic that would be required if all links were retried after every predetermined interval. It is more important to retry those hot links which were found to be unavailable during the previous iteration for the following reason. The unavailable marking will dissuade a user from selecting this hot link and if the status changes, then the user would needlessly bypass this hot link and the associated information if the status was not updated.

Figure 5:
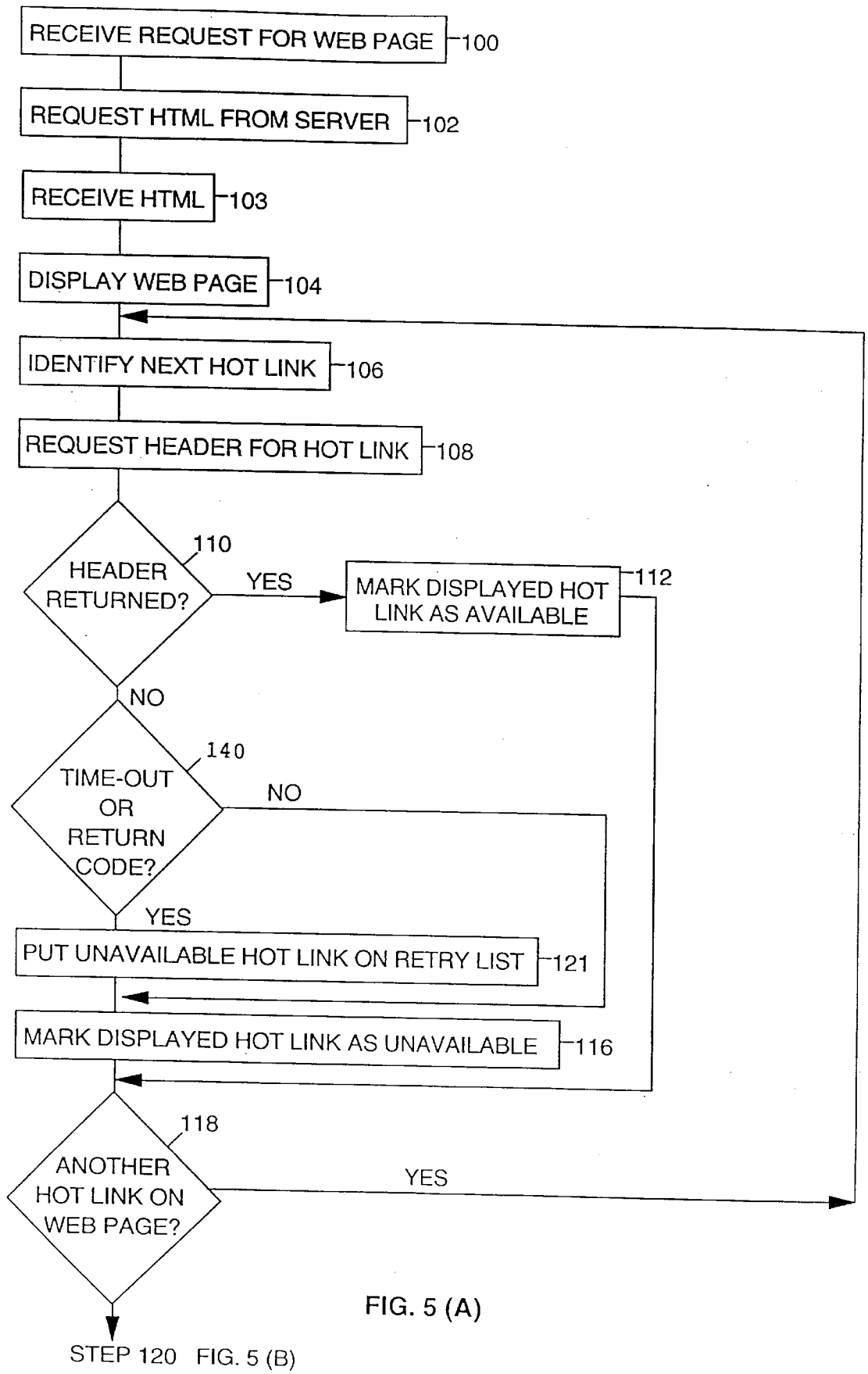
FIGS. 5(a) and 5(b) are flow charts illustrating a web browser in the client of FIG. 1 according to yet another embodiment of the present invention.
Figure 5:
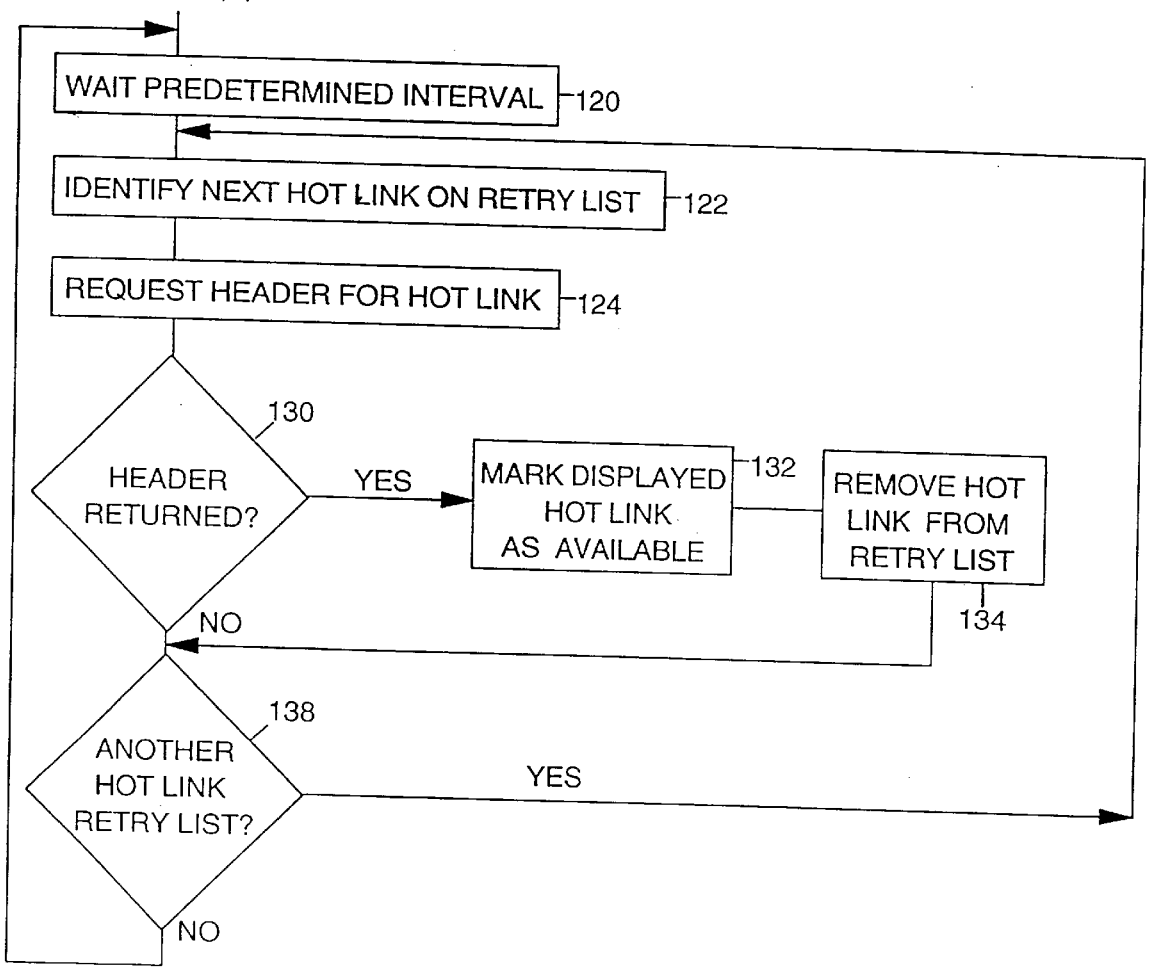

The embodiment of FIG. 5 is identical to the embodiment of FIG. 4 except for the following. Decision 140 is inserted between decision 110 and step 121 to refine the retry list and thereby reduce the number of hot links that must be retried and the corresponding network traffic. Decision 140 determines if the lack of the header information was due to the web browser 17 receiving no response to the header request (after a time-out) or receiving the "404" ("not found") return code. Only in these two cases is the hot link added to the retry list. If the header information is not returned for any other reason, then the hot link is not added to the retry list. In the second scenario, one of these cases is true, so decision 140 leads to step 121 in which the hot link is added to the retry list.

Third Scenario

The web page is not in existence or the hot link does not properly refer to a web page on server 12 (or any other existing server). In the former case, server 12 or an intermediary server, if any, returns a "410" code. In the latter case, server 12 or an intermediary server returns a "400" code.

In the embodiment of FIG. 2, server 12 does not return the header information to web browser 10. In this scenario, the web browser does not receive any header information (decision 110), and marks the display of the respective hot link as unavailable (step 116). Then, assuming there are other hot links on the displayed web page yet to be tested (decision 118), web browser 17 repeats steps 106 and 108 for the next hot link on the displayed web page.

In the embodiment of FIG. 3, server 12 does not return the header information to web browser 10. In this scenario, the web browser does not receive any header information (decision 110), and marks the display of the respective hot link as unavailable (step 116). Then, assuming there are other hot links on the displayed web page yet to be tested (decision 118), web browser 17 loops back to step 106 for the next hot link on the displayed web page. After all the hot links on the displayed web page are tested (decision 118), web browser 10 waits a predetermined interval and loops back to step 106 to retry all the hot links on the displayed web page.

In the embodiment of FIG. 4, server 12 does not return the header information to web browser 10. In this scenario, the web browser does not receive any header information (decision 110), adds the hot link/web page to the retry list 113 (step 121) and marks the display of the respective hot link as unavailable (step 116). Then, assuming there are other hot links on the displayed web page yet to be tested (decision 118), web browser 17 loops back to step 106 for the next hot link on the displayed web page. After all the hot links on the web page have been tested (decision 118), the web browser waits a predetermined period such as twenty seconds and then identifies the first hot link on the retry list (step 122). Then the web browser sends a header request to the server 12 for the hot linked web page (step 124). If the header information is returned (decision 130), then web browser 10 changes the marking of the displayed hot link to available (step 132) and removes this hot link from the retry list (step 134). However, if the header information was not returned (decision 130), there is no cause to change the display. After either step 134 or a "no" decision 130, web browser 17 loops back to step 122 for the next hot link, if any, on the retry list (decision 138). When all the hot linked web pages on the retry list have been retried, the web browser loops back to step 120 to wait another predetermined time interval and retry the remaining hot linked web pages, if any on the retry list.

The embodiment of FIG. 5 is identical to the embodiment of FIG. 4 except for the following. Decision 140 is inserted between decision 110 and step 121 to refine the retry list and thereby reduce the number of hot linked web pages that must be retried and the corresponding network traffic. Decision 140 determines if the lack of the header information was due to the web browser 17 receiving no response to the header request (after a time-out) or receiving the "404" return code. Only in these two cases is the hot link added to the retry list. If the header information is not returned for any other reason, then the hot link is not added to the retry list. In the third scenario, neither case is true, the return code is "400" or "410". Therefore, decision 140 leads directly to step 116 bypassing step 121 so the hot linked web page is not added to the retry list. In the third scenario, the chances are small that the web page will become available in the near future, so it is not worth the network traffic to retry this web page.

Fourth Scenario, Fifth Embodiment

Figure 6:
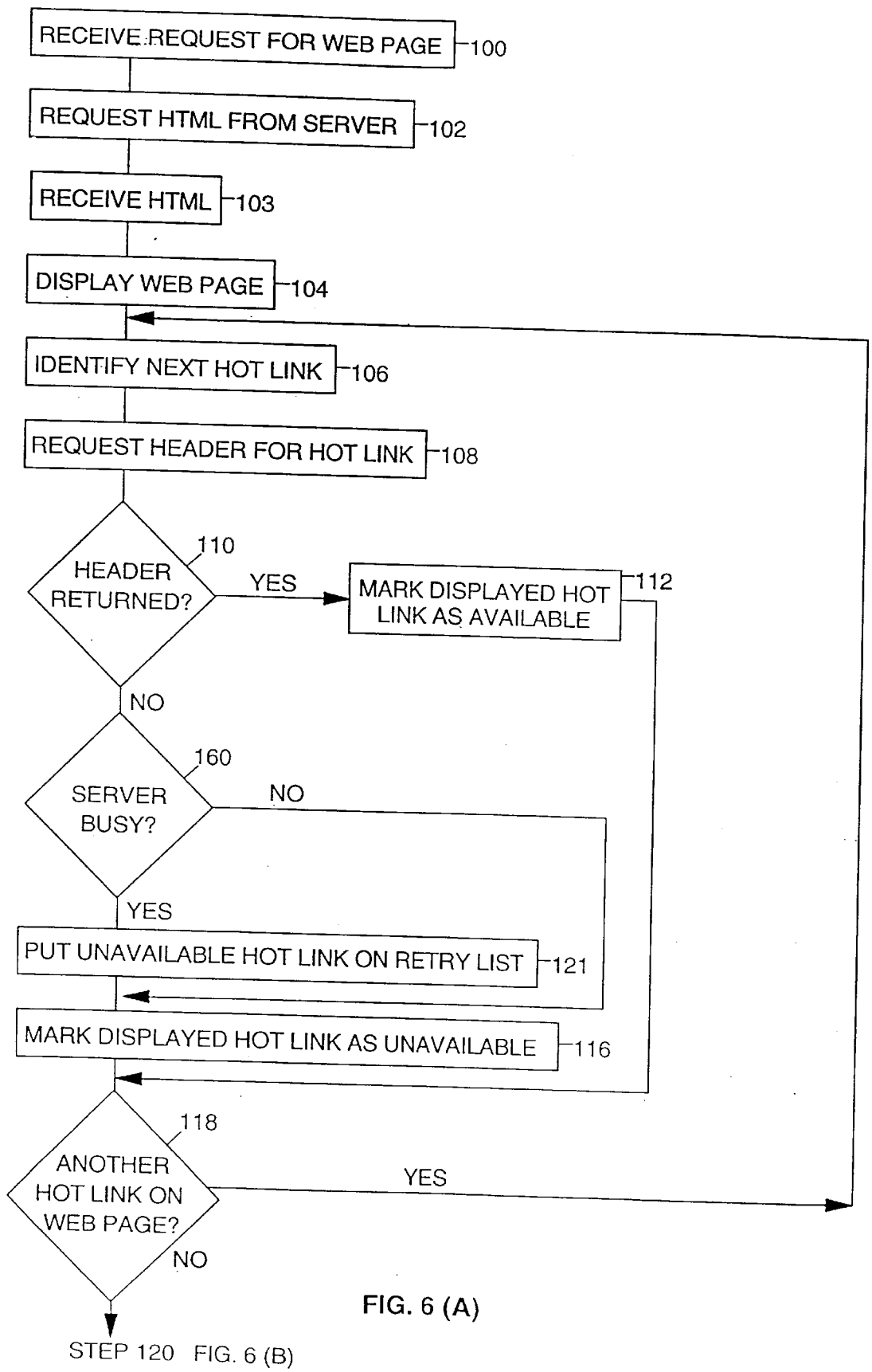
FIGS. 6(a) and 6(b) are flow charts illustrating a web browser in the client of FIG. 1 according to yet another embodiment of the present invention.
Figure 6:
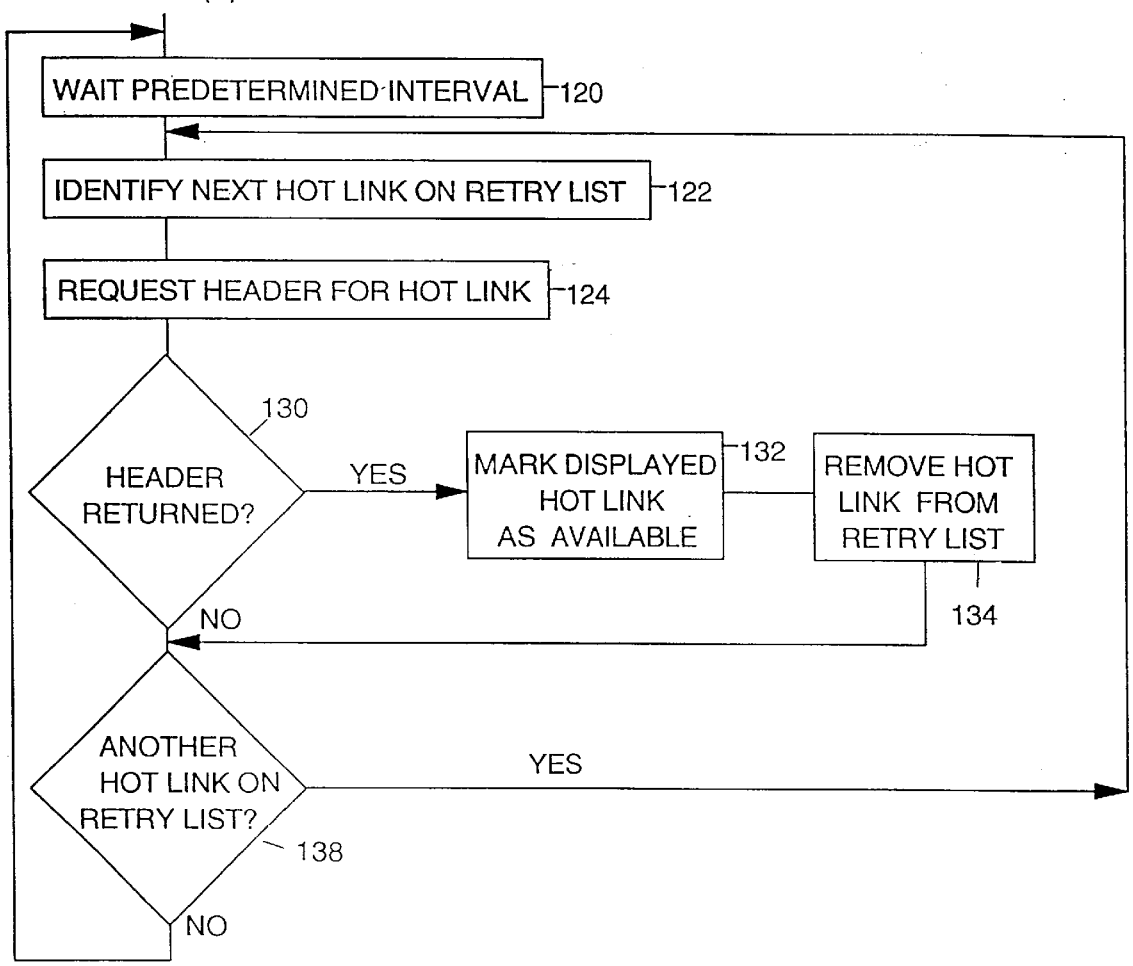

The fifth embodiment of the present invention is illustrated in FIG. 6 and is identical to the embodiment of FIG. 4 except for the following. Decision 160 is inserted between decision 110 and step 121 to refine the retry list and thereby reduce the number of hot links that must be retried and the corresponding network traffic. Decision 160 determines if the lack of the header information was due to server 12 being in existence but busy with other requests. Currently, the WWW protocol does not provide a specific return code indicating this; however, the WWW protocol or specific servers could be so modified in the future. Only in the case of server 12 (or other target servers) being in existence but busy is the hot linked web page added to the retry list. If the header information is not returned for any other reason, then the hot linked web page is not added to the retry list. In the fourth scenario where server 12 or an intermediary server returns a code indicating that server 12 exists but is busy with other requests, the chances are good that server 12 will become available to handle other requests in the near future. So, in this scenario it is worth the network traffic to retry this hot link.

In all the embodiments of the present invention under all the foregoing scenarios, there are various ways to mark a displayed hot link as available such as bracketing the hot link with green brackets or underlining the hot link with a green underline. Likewise, there are various ways to mark a displayed hot link as unavailable such as bracketing the hot link with red brackets or underlining the hot link with a red underline.

In all the embodiments of the present invention under all the foregoing scenarios, if the user selects a hot link on the displayed web page during automatic testing of the hot links by the web browser, the user selection will preempt the automatic testing of the hot links and the web browser will halt the automatic testing of the hot links and respond to the user selection immediately (by requesting the HTML from the appropriate server and loading the new web page). The web browser will then begin automatic testing of the hot links for the new web page.

Based on the foregoing, web browsers according to the present invention have been disclosed. However, numerous modifications and substitutions can be made without deviating from the scope of the present invention. Therefore, the present invention has been disclosed by way of illustration and not limitation and reference should be made to the following claims to determine the scope of the present invention.

What is claimed is:

1. A computer system for checking and indicating availability of hot links on a displayed web page obtained from a world wide web, said system comprising:

means for requesting header information but not htmls from one or more servers for a plurality of hot links on the displayed web page, each of said hot links having a corresponding html;

means, responsive to receipt of the header information for one of said hot links, for indicating on the displayed web page that said one hot link is available; and means, responsive to user selection of said one hot link indicated as available, for loading the html corresponding to said one hot link.

2. A computer system as set forth in claim 1 further comprising:

means, responsive to failure to receive the header information for another of said hot links, for indicating on the displayed web page that said other hot link is not available; and means, responsive to user selection of said other hot link indicated as not available, for attempting to load the html corresponding to said other hot link.

3. A computer system as set forth in claim 2 further comprising means for repeating the request for said header information but not htmls for hot links for which header information was not previously received but not repeating the request for said header information for hot links for which header information was previously received.

4. A computer system as set forth in claim 3 wherein the second said indicating means responds, following the repeated request, to failure to receive the header information for a third one of said hot links for which header information was not previously received by maintaining the indication on the displayed web page that said third hot link is not available.

5. A computer system as set forth in claim 3 wherein said repeating means is automatic whereby a user is not required to initiate said repeating means.

6. A computer system as set forth in claim 3 wherein the first said indicating means responds, following the repeated request, to receipt of the header information for said other hot link for which header information was not previously received by changing the indication on the displayed web page to indicate that said other hot link is available.

7. A computer system as set forth in claim 2 further comprising means for repeating the request for said header information but not htmls for hot links for which header information was not previously received during a predetermined time interval after the first said request was made and for which no return code was received, but not repeating the request for said header information for other hot links for which header information was not previously received for other reasons and other hot links for which header information was previously received, and wherein:

the first said indicating means responds, following the repeated request, to receipt of the header information for a third one of the hot links for which header information was not previously received during a predetermined time interval after the request was made and for which no return code was received, by indicating on the displayed web page that said third hot link is available.

8. A computer system as set forth in claim 7 wherein the second said indicating means responds, following the repeated request, to failure to receive the header information for a fourth one of said hot links for which header information was not previously received during a predetermined time interval after the request was made and for which no return code was received, by maintaining the indication on the displayed web page that said fourth hot link is not available.

9. A computer system as set forth in claim 2 further comprising means for repeating the request for said header information but not htmls for hot links for which header information was not previously received because the corresponding web page was not found, but not repeating the request for said header information for other hot links for which header information was not previously received for other reasons and other hot links for which header information was previously received, and wherein:

the first said indicating means responds, following the repeated request, to receipt of the header information for a third one of the hot links for which header information was not previously received because the corresponding web page was not found, by changing the indication on the displayed web page to indicate that said third hot link is available.

10. A computer system as set forth in claim 9 wherein the second said indicating means responds, following the repeated request, to failure to receive the header information for a fourth one of said hot links for which header information was not previously received because the corresponding web page was not found, by maintaining the indication on the displayed web page that said fourth hot link is not available.

11. A computer system as set forth in claim 2 further comprising means for repeating the request for said header information but not htmls for hot links for which header information was not previously received because the corresponding web page was not found or not received during a predetermined time interval after the request was made for which no return code was received, but not repeating the request for said header information for other hot links for which header information was not previously received for other reasons and other hot links for which header information was previously received, and wherein:

the first said indicating means responds, following the repeated request, to receipt of the header information for a third one of the hot links for which header information was not previously received because the corresponding web page was not found or not received during a predetermined time interval after the request was made for which no return code was provided, by indicating on the displayed web page that said third hot link is available.

12. A computer system as set forth in claim 11 wherein the second said indicating means responds, following the repeated request, to failure to receive the header information for a fourth one of said hot links for which header information was not previously received because the corresponding web page was not found or not received during a predetermined time interval after the request was made for which no return code was provided, by maintaining the indication on the displayed web page that said fourth hot link is not available.

13. A computer system as set forth in claim 2 further comprising means for repeating the request for said header information but not htmls for hot links for which header information was not previously received because the respective server was busy but not repeating the request for said header information for other hot links for which header information was not previously received for other reasons and other hot links for which header information was previously received, and wherein:

the first said indicating means responds, following the repeated request, to receipt of the header information for a third one of the hot links for which header information was not previously received because the respective server was busy by changing the indication on the displayed web page to indicate that said third hot link is available.

14. A computer system as set forth in claim 13 wherein the second said indicating means responds, following the repeated request, to failure to receive the header information for a fourth one of said hot links for which header information was not previously received because the respective server was busy by maintaining the indication on the displayed web page that said fourth hot link is not available.

15. A computer system as set forth in claim 2 further comprising means for automatically, periodically repeating the request for said header information but not htmls for said plurality of hot links, said automatic, periodic request repetitions not requiring initiation by a user, and wherein:

the first said indicating means responds to receipt of the header information for one or more of said hot links following the repeated request by indicating on the displayed web page that said one or more hot links are available; and the second said indicating means responds to the failure to receive the header information for one or more other of said hot links following the repeated request by indicating on the displayed web page that said one or more other hot links are not available.

16. A computer system as set forth in claim 1 wherein said web page has a corresponding html file.

17. A method for checking and indicating availability of hot links on a displayed web page obtained from a world wide web, said method comprising the steps of:

requesting header information but not htmls from one or more servers for a plurality of hot links on the displayed web page, each of said hot links having a corresponding html;

in response to receipt of the header information for one of said hot links, indicating on the displayed web page that said one hot link is available; and in response to user selection of said one hot link with the indication of availability, loading the html for said one hot link indicated as available.

18. A method as set forth in claim 17 further comprising the steps of:

in response to failure to receive the header information for another of said hot links, indicating on the displayed web page that said other hot link is not available; and in response to user selection of said other hot link with the indication of non-availability, attempting to load the html for said other hot link indicated as not available.

19. A method as set forth in claim 18 further comprising the steps of:

repeating the request for said header information but not htmls for hot links for which header information was not previously received but not repeating the request for said header information for hot links for which header information was previously received.

20. A method as set forth in claim 19 wherein said repeating step is automatic, whereby a user is not required to initiate said repeating step.

21. A method as set forth in claim 19 further comprising the step of:

following the request repeat step, responding to receipt of the header information for said other hot link for which header information was not previously received by changing the indication on the displayed web page to indicate that said other hot link is available.

22. A method as set forth in claim 18 further comprising the steps of:

automatically, periodically repeating the request for said header information but not htmls for said plurality of hot links, said automatic, periodic request repetitions not requiring initiation by a user;

responding to receipt of the header information for one or more of said hot links following the repeated request by indicating on the displayed web page that said one or more hot links are available; and responding to the failure to receive the header information for one or more other of said hot links following the repeated request by indicating on the displayed web page that said one or more other hot links are not available.

23. A method as set forth in claim 18 further comprising the steps of:

repeating the request for said header information but not htmls for hot links for which header information was not previously received during a predetermined time interval after the first said request was made and for which no return code was received, but not repeating the request for said header information for other hot links for which header information was not previously received for other reasons and other hot links for which header information was previously received; and following the repeating step, responding to receipt of the header information for a third one of the hot links for which header information was not previously received during a predetermined time interval after the request was made and for which no return code was received, by indicating on the displayed web page that said third hot link is available.

24. A method as set forth in claim 18 further comprising the step of:

repeating the request for said header information but not htmls for hot links for which header information was not previously received because the corresponding web page was not found, but not repeating the request for said header information for other hot links for which header information was not previously received for other reasons and other hot links for which header information was previously received; and following the repeating step, responding to receipt of the header information for a third one of the hot links for which header information was not previously received because the corresponding web page was not found, by changing the indication on the displayed web page to indicate that said third hot link is available.

25. A method as set forth in claim 18 further comprising the steps of:

repeating the request for said header information but not htmls for hot links for which header information was not previously received because the corresponding web page was not found or not received during a predetermined time interval after the request was made for which no return code was received, but not repeating the request for said header information for other hot links for which header information was not previously received for other reasons and other hot links for which header information was previously received; and following the repeating step, responding to receipt of the header information for a third one of the hot links for which header information was not previously received because the corresponding web page was not found or not received during a predetermined time interval after the request was made for which no return code was provided, by indicating on the displayed web page that said third hot link is available.

26. A method as set forth in claim 18 further comprising the steps of:

repeating the request for said header information but not htmls for hot links for which header information was not previously received because the respective server was busy but not repeating the request for said header information for other hot links for which header information was not previously received for other reasons and other hot links for which header information was previously received; and following the repeated request, responding to receipt of the header information for a third one of the hot links for which header information was not previously received because the respective server was busy by changing the indication on the displayed web page to indicate that said third hot link is available.

27. A method as set forth in claim 17 wherein said web page has a corresponding html file.

28. A computer program product for instructing a processor to check and indicate availability of hot links on a displayed web page obtained from a world wide web, said computer program product comprising:

a computer readable medium;

first program instruction means for instructing a processor to request header information but not htmls from one or more servers for a plurality of hot links on the displayed web page, each of said hot links having a corresponding html;

second program instruction means for instructing a processor to respond to receipt of the header information for one of said hot links, by indicating on the displayed web page that said one hot link is available; and third program instruction means for instructing a processor to respond to user selection of said one hot link, by loading the html corresponding to said one hot link indicated as available; and wherein all of said program instruction means are recorded on said medium.

29. A computer program product as set forth in claim 28 further comprising fourth program instruction means for instructing a processor to repeat the request for said header information but not htmls for hot links for which header information was not previously received but not repeat the request for said header information for hot links for which header information was previously received, and wherein:

said second program instruction means instructs a processor to respond, following the repeat request, to receipt of the header information for one or more of the hot links for which header information was not previously received by changing the indication on the displayed web page to indicate that said one or more hot links are available; and said fourth program instruction means is recorded on said medium.

30. A computer program product as set forth in claim 29 wherein said fourth program instruction means automatically, periodically instructs said processor to repeat the request for said header information but not htmls, whereby a user is not required to initiate said repeat request.

31. A computer program product as set forth in claim 28 further comprising:

fourth program instruction means for instructing a processor to respond to failure to receive the header information for another of said hot links, by indicating on the displayed web page that said other hot link is not available; and fifth program instruction means for instructing a processor to respond to user selection of said other hot link, by attempting to load the html corresponding to said other hot link; and wherein said fourth and fifth program instruction means are recorded on said medium.

32. A computer program product as set forth in claim 28 wherein said web page has a corresponding html file.

33. A computer system for checking and indicating availability of hot links on a displayed web page obtained from a world wide web, said system comprising:

means for requesting header information from one or more servers for a plurality of hot links on the displayed web page;

means, responsive to failure to receive the header information for one of said hot links, for indicating on the displayed web page that said one hot link is not available; and means, responsive to user selection of said one hot link indicated as not available, for attempting to load the html for said one hot link.

34. A method for checking and indicating availability of hot links on a displayed web page obtained from a world wide web, said method comprising the steps of:

requesting header information from one or more servers for a plurality of hot links on the displayed web page;

in response to failure to receive the header information for one of said hot links, indicating on the displayed web page that said one hot link is not available; and in response to user selection of said one hot link with the indication of non-availability, attempting to load the html for said one hot link indicated as not available.

35. A method for checking and indicating availability of hot links on a displayed web page, said method comprising the steps of:

requesting header information but not htmls from one or more servers for a plurality of hot links on the displayed web page;

in response to receipt of the header information for one of said hot links, indicating on the displayed web page that said one hot link is available; and automatically repeating the request for said header information but not htmls for hot links for which header information was not previously received but not automatically repeating the request for said header information for hot links for which header information was previously received.

* * * * *